US012437717B2

(12) United States Patent
An et al.

(10) Patent No.: US 12,437,717 B2
(45) Date of Patent: Oct. 7, 2025

(54) PIXEL AND DISPLAY APPARATUS

(71) Applicant: Samsung Display Co., Ltd., Yongin-si (KR)

(72) Inventors: Jinsung An, Yongin-si (KR); Sungho Kim, Yongin-si (KR); Yongjae Kim, Yongin-si (KR); Yoonjee Shin, Yongin-si (KR); Sugwoo Jung, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/525,303

(22) Filed: Nov. 30, 2023

(65) Prior Publication Data

US 2024/0321203 A1 Sep. 26, 2024

(30) Foreign Application Priority Data

Mar. 24, 2023 (KR) .................. KR10-2023-0039031
Mar. 29, 2023 (KR) .................. KR10-2023-0041534

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2310/08* (2013.01); *G09G 2320/0626* (2013.01); *G09G 2330/021* (2013.01)

(58) Field of Classification Search
CPC ............... G09G 3/3233; G09G 3/3266; G09G 2300/0819; G09G 2310/08; G09G 2320/0626; G09G 2340/0435; G09G 2300/0861; G09G 2330/021
See application file for complete search history.

(56) References Cited

U.S. PATENT DOCUMENTS

| | | | | |
|---|---|---|---|---|
| 8,654,069 | B2 | 2/2014 | Mamba et al. | |
| 2021/0027696 | A1* | 1/2021 | Kim | G09G 3/3233 |
| 2021/0125543 | A1* | 4/2021 | Kim | G09G 3/3233 |
| 2021/0134210 | A1* | 5/2021 | In | G09G 3/3233 |
| 2021/0375193 | A1* | 12/2021 | Son | G09G 3/3233 |
| 2022/0157226 | A1 | 5/2022 | Oh et al. | |
| 2022/0230591 | A1 | 7/2022 | Na | |

(Continued)

FOREIGN PATENT DOCUMENTS

| | | | |
|---|---|---|---|
| KR | 20210013509 | A | 2/2021 |
| KR | 20210050050 | A | 5/2021 |

(Continued)

*Primary Examiner* — Xuemei Zheng
(74) *Attorney, Agent, or Firm* — CANTOR COLBURN LLP

(57) ABSTRACT

A pixel in which a luminance difference may be reduced during low-frequency driving, and a display apparatus including the same, there is provided a pixel that operates at a first scanning rate in a first mode and operates at a second scanning rate in a second mode, wherein the pixel includes a display element having an anode and a cathode, a first transistor that controls the magnitude of a driving current flowing to the display element according to a gate-source voltage, and a second transistor that is in an off state in the first mode and transmits a bias voltage to the first transistor in response to a first scan signal in the second mode.

20 Claims, 7 Drawing Sheets

(56) References Cited

U.S. PATENT DOCUMENTS

| | | | | |
|---|---|---|---|---|
| 2022/0262303 | A1 | 8/2022 | Kim et al. | |
| 2022/0270546 | A1 | 8/2022 | Kim et al. | |
| 2023/0108303 | A1* | 4/2023 | Xie | G09G 3/3233 345/690 |
| 2024/0161705 | A1* | 5/2024 | Sang | G09G 3/3233 |
| 2024/0221651 | A1* | 7/2024 | Park | G09G 3/3233 |
| 2024/0257739 | A1* | 8/2024 | Noh | G09G 3/3233 |

FOREIGN PATENT DOCUMENTS

| | | | |
|---|---|---|---|
| KR | 20210081507 | A | 7/2021 |
| KR | 20210086801 | A | 7/2021 |

* cited by examiner

PIXEL AND DISPLAY APPARATUS

This application claims priority to Korean Patent Application No. 10-2023-0039031, filed on Mar. 24, 2023, and Korean Patent Application No. 10-2023-0041534, filed on Mar. 29, 2023, and all the benefits accruing therefrom under 35 U.S.C. § 119, the contents of which in their entirety are herein incorporated by reference.

BACKGROUND

One or more embodiments relate to a pixel and a display apparatus.

Organic light-emitting display apparatuses include display elements, for example, organic light-emitting diodes, of which the luminance is changed by a current. One pixel of the organic light-emitting display apparatuses includes a display element, a driving transistor that controls the amount of current supplied to the display element according to a voltage between a gate and a source, and a switching transistor that transmits a data voltage for controlling the luminance of the display element to the driving transistor.

The voltage between the gate and the source of the driving transistor needs to be kept constant in order to maintain a constant luminance of the display element during one frame. To this end, the pixel further includes a storage capacitor connected to the gate of the driving transistor.

In order to display a more vivid image, the resolutions of organic light-emitting display apparatuses is gradually increasing, and the size of pixels are gradually decreasing. In order to reduce the sizes of pixels, the capacity of storage capacitors is also decreasing. Accordingly, a gate voltage of driving transistors is changed even by a small leakage current, and thus, the luminance of display elements is changed.

In addition, in order to reduce power consumption of organic light-emitting display apparatuses or electronic devices connected thereto, a technology of driving pixels of the display at a low frame rate according to circumstances is being applied.

SUMMARY

One or more embodiments include a display apparatus including pixels in which a luminance difference may be reduced during low-frequency driving.

According to one or more embodiments, a pixel that operates at a first scanning rate in a first mode and operates at a second scanning rate in a second mode includes a display element having an anode and a cathode, a first transistor that controls a magnitude of a driving current flowing to the display element according to a gate-source voltage, and a second transistor that is in an off state in the first mode and transmits a bias voltage to the first transistor in response to a first scan signal in the second mode.

According to an embodiment, the second scanning rate may be smaller than the first scanning rate.

According to an embodiment, one frame period in the second mode may include a display scanning period and a self-scanning period, and the first scan signal may have a voltage at a turn-off level during the display scanning period and may have a pulse at a turn-on level during the self-scanning period.

According to an embodiment, a width of a pulse voltage at the turn-on level may be greater than one horizontal scanning period (1H).

According to an embodiment, the pixel may further include a first capacitor connected to a gate of the first transistor, a third transistor that transmits a data voltage to a source of the first transistor in response to a second scan signal and a fourth transistor that transmits a first initialization voltage to the anode of the display element in response to a third scan signal, wherein the second transistor may transmit the bias voltage to the source of the first transistor in response to the first scan signal in the second mode.

According to an embodiment, one frame mode in the second mode may include a display scanning period and a self-scanning period, the first scan signal may have a voltage at a turn-off level during the display scanning period and may have a first pulse at a turn-on level during the self-scanning period, the second scan signal may have second pulses at the turn-on level respectively in the display scanning period and the self-scanning period, and the third scan signal may have third pulses at the turn-on level respectively in the display scanning period and the self-scanning period.

According to an embodiment, a width of the first pulse may be greater than a width of each of the second pulses and a width of each of the third pulses.

According to an embodiment, an interval between a falling edge of each of the second pulses and a falling edge of each of the third pulses may be one horizontal scanning period (1H).

According to an embodiment, the data voltage transmitted to the source of the first transistor in the self-scanning period may substantially be the same as the bias voltage.

According to an embodiment, a level of the bias voltage may be greater than a level of the first initialization voltage.

According to an embodiment, the pixel may further include a fifth transistor that connects the gate and a drain of the first transistor with each other in response to a fourth scan signal, wherein one frame period in the second mode may include a display scanning period and a self-scanning period, and the fourth scan signal may have a fourth pulse at a turn-on level in the display scanning period and may have a voltage at a turn-off level during the self-scanning period.

According to an embodiment, the pixel may further include a sixth transistor that transmits a second initialization voltage to the gate of the first transistor in response to a fifth scan signal, wherein the fifth scan signal may have a fifth pulse at the turn-on level in the display scanning period and may have a voltage at the turn-off level during the self-scanning period.

According to an embodiment, the second scan signal may have second pulses at the turn-on level respectively in the display scanning period and the self-scanning period, and a width of the fourth pulse may be substantially equal to a width of each of the second pulses and a width of the fifth pulse.

According to an embodiment, the pixel may further include a second capacitor connected to the source of the first transistor.

According to one or more embodiments, a pixel that operates at a first scanning rate in a first mode, operates at a second scanning rate in a second mode, and is connected to first to fifth scan lines that respectively transmits first to fifth scan signals, an emission control line that transmits an emission control signal, a data line that transmits a data voltage, a power line that transmits a driving voltage, and first to third voltage lines that respectively transmit a first initialization voltage, a second initialization voltage, and a bias voltage is provided. The pixel includes a display element having an anode and a cathode, a first capacitor having a first electrode connected to the power line, and a second electrode, a first transistor having a gate connected to the second electrode of the first capacitor, a source connected to the power line, and a drain connected to the anode of the display element, a second transistor having a gate connected to the first scan line, a source connected to the data line, and a drain connected to the source of the first transistor. The pixel further includes a third transistor having a gate connected to the second scan line, a source connected to the drain of the first transistor, and a drain connected to the gate of the first transistor, a fourth transistor having a gate connected to the third scan line, a source connected to the gate of the first transistor, and a drain connected to the first voltage line, a fifth transistor having a gate connected to the emission control line, a source connected to the power line, and a drain connected to the source of the first transistor, a sixth transistor having a gate connected to the emission control line, a source connected to the drain of the first transistor, and a drain connected to the anode of the display element, a seventh transistor having a gate connected to the fourth scan line, a source connected to the anode of the display element, and a drain connected to the second voltage line, and an eighth transistor having a gate connected to the fifth scan line, a source connected to the third voltage line, and a drain connected to the source of the first transistor, and being in an off state in the first mode.

According to an embodiment, the second scanning rate may be smaller than the first scanning rate.

According to an embodiment, the pixel may further include a second capacitor having a third electrode connected to the power line, and a fourth electrode connected to the source of the first transistor.

According to an embodiment, one frame period in the second mode may include a display scanning period and a self-scanning period, first pulses at a turn-on level may be applied to the first scan line in the display scanning period and the self-scanning period, respectively, a second pulse at the turn-on level may be applied to the second scan line in the display scanning period, and a voltage at a turn-off level may be applied to the second scan line during the self-scanning period, a third pulse at the turn-on level may be applied to the third scan line in the display scanning period, and a voltage at the turn-off level may be applied to the third scan line during the self-scanning period, fourth pulses at the turn-on level may be applied to the fourth scan line in the display scanning period and the self-scanning period, respectively, and a voltage at the turn-off level may be applied to the fifth scan line during the display scanning period, and a fifth pulse at the turn-on level may be applied to the fifth scan line in the self-scanning period.

According to an embodiment, a width of the fifth pulse may be greater than a width of each of the first pulses and a width of each of the fourth pulses.

According to one or more embodiments, a display apparatus includes a substrate extending in a first direction and a second direction, and a plurality of pixels disposed on the substrate in the first direction and the second direction and including the pixel.

Other aspects, features, and advantages than those described above will become apparent from the following drawings, claims, and detailed descriptions to embody the disclosure below.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
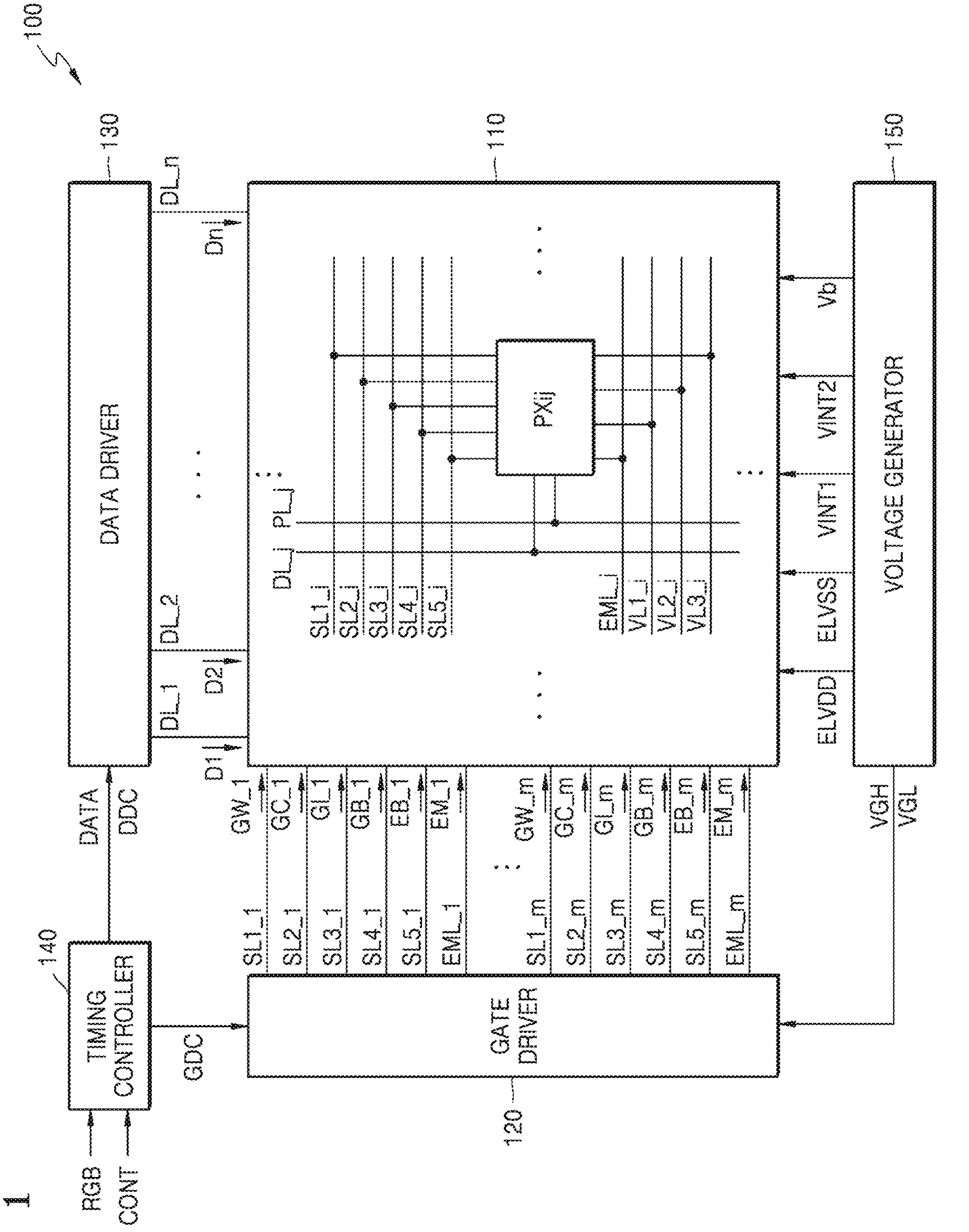
FIG. 1 is a schematic block diagram of an organic light-emitting display apparatus according to an embodiment.

The invention may be modified in various ways and take on various alternative forms, and specific embodiments thereof are shown in the drawings and described in detail below as examples. The effect and features of the embodiments, and a method to achieve the same, will be clearer referring to the detailed descriptions below with the drawings. However, the disclosure may be implemented in various forms, not by being limited to the embodiments presented below.

Hereinafter, embodiments will be described in detail with reference to the accompanying drawings, and in the description with reference to the drawings, the same and/or corresponding components are indicated by the same reference numerals and redundant descriptions thereof are omitted.

In the embodiments, it will be understood that although the terms “first,” “second,” etc. may be used herein to describe various components, these components should not be limited by these terms. These terms are only used to distinguish one component from another.

In the embodiments, the expression of singularity in the specification includes the expression of plurality unless clearly specified otherwise in context.

In the embodiments, it will be further understood that the terms “comprises” and/or “comprising” used herein specify the presence of stated features and/or components, but do not preclude the presence and/or addition of one or more other features and/or components.

In the embodiments, it will be understood that when a layer, region, and/or component is referred to as being “formed on” another layer, region, and/or component, it can be directly or indirectly formed on the other layer, region, and/or component. That is, for example, intervening layers, regions, and/or components may be present.

Sizes of components in the drawings may be exaggerated or reduced for convenience of explanation. In other words, since sizes and thicknesses of components in the drawings are arbitrarily illustrated for convenience of explanation, the following embodiments are not limited thereto.

When an embodiment may be implemented differently, a specific process order may be performed differently from the described order. For example, two consecutively described processes may be performed substantially at the same time and/or performed in an order opposite to the described order.

In the specification, the expression "A and/or B" represents A, B, or A and B. In addition, the expression "at least one of A and B" represents A, B, or A and B.

In an embodiment, it will be understood that when a layer, region, and/or component is connected to another layer, region, and/or component, the layers, regions and/or components may be directly connected, and/or may be indirectly connected via another layer, region, and/or component therebetween. For example, in the specification, when a layer, region, and/or component is electrically connected to another layer, region, and/or component, the layers, regions, and/or components may not only be directly electrically connected, but may also be indirectly electrically connected via another layer, region, and/or component therebetween.

The x-axis, the y-axis, and the z-axis are not limited to three axes of the rectangular coordinate system, and may be interpreted in a broader sense. For example, the x-axis, the y-axis, and the z-axis may be perpendicular to one another, and/or may represent different directions that are not perpendicular to one another.

FIG. 1 is a schematic block diagram of an organic light-emitting display apparatus according to an embodiment.

Referring to FIG. 1, in an embodiment an organic light-emitting display apparatus 100 includes a display unit 110, a gate driver 120, a data driver 130, a timing controller 140, and a voltage generator 150*s*.

In an embodiment, the display unit 110 includes pixels PX such as a pixel PXij located in an $i^{th}$ row and a $j^{th}$ column. Although FIG. 1 illustrates only one pixel PXij for easy understanding, m×n pixels PX may be arranged in, for example, a matrix form. In this regard, i is a natural number of at least 1 and not more than m, and j is a natural number of at least 1 and not more than n.

Figure 2:
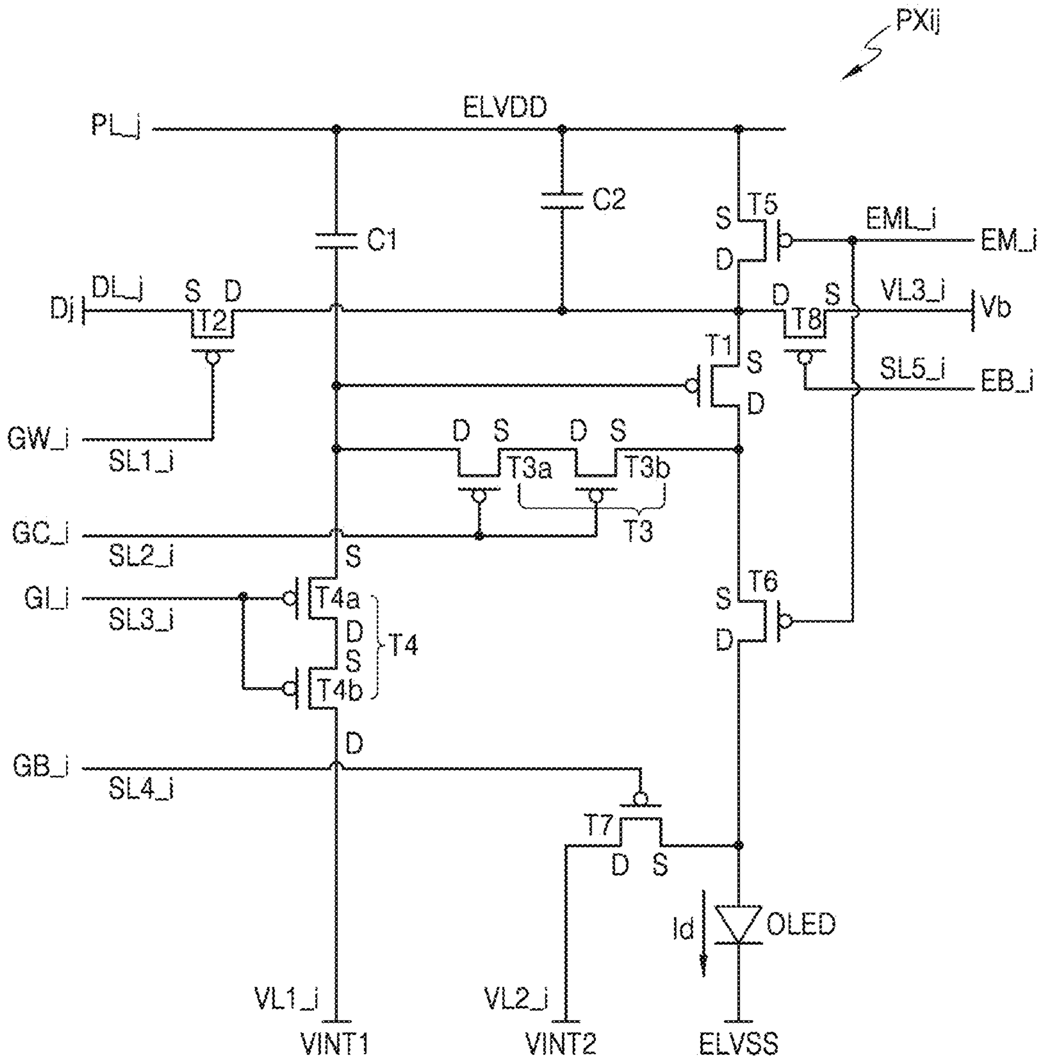
FIG. 2 is a circuit schematic of a pixel according to an embodiment.

In an embodiment, the pixels PX are connected to first scan lines SL1_1 to SL1_*m*, second scan lines SL2_1 to SL2_*m*, third scan lines SL3_1 to SL3_*m*, fourth scan lines SL4_1 to SL4_*m*, fifth scan lines SL5_1 to SL5_*m*, emission control lines EML_1 to EML_m, and data lines DL_1 to DL_n. The pixels PX are connected to power lines PL_1 to PL_n, first voltage lines VL1_1 to VL1_*m*, second voltage lines VL2_1 to VL2_*m*, and third voltage lines VL3_1 to VL3_*m*. For example, as shown in FIG. 2, the pixel PXij may be connected to the first scan line SL1_*i*, the second scan line SL2_*i*, the third scan line SL3_*i*, the fourth scan line SL4_*i*, the fifth scan line SL5_*i*, the emission control line EML_i, the data line DL_j, the power line PL_j, the first voltage line VL1_*i*, the second voltage line VL2_*i*, and the third voltage line VL3_*i*.

In an embodiment, the first scan lines SL1_1 to SL1_*m*, the second scan lines SL2_1 to SL2_*m*, the third scan lines SL3_1 to SL3_*m*, the fourth scan lines SL4_1 to SL4_*m*, the fifth scan lines SL5_1 to SL5_*m*, the emission control lines EML_1 to EML_m, the first voltage lines VL1_1 to VL1_*m*, the second voltage lines VL2_1 to VL2_*m*, and the third voltage lines VL3_1 to VL3_*m* may extend in a first direction (for example, row direction) and may be connected to pixels PX located in the same row. The data lines DL_1 to DL_n and the power lines PL_1 to PL_n may extend in a second direction (for example, column direction) and be connected to pixels PX located in the same column.

In an embodiment, the first scan lines SL1_1 to SL1_*m* respectively transmit first scan signals GW_1 to GW_m output from the gate driver 120 to the pixels PX in the same row, the second scan lines SL2_1 to SL2_*m* respectively transmit second scan signals GC_1 to GC_m output from the gate driver 120 to the pixels PX in the same row, and the third scan lines SL3_1 to SL3_*m* respectively transmit third scan signals GI_1 to GI_m output from the gate driver 120 to the pixels PX in the same row. The fourth scan lines SL4_1 to SL4_*m* respectively transmit fourth scan signals GB_1 to GB_m output from the gate driver 120 to the pixels PX in the same row, and the fifth scan lines SL5_1 to SL5_*m* respectively transmit fifth scan signals EB_1 to EB_m output from the gate driver 120 to the pixels PX in the same row.

In an embodiment, a first scan line SL1_*i*+1 and the fourth scan line SL4_*i* may be the same scan line. Both a first scan signal GW_i+1 and the fourth scan signal GB_i are transmitted through the first scan line SL1_*i*+1 and may actually be the same signal.

In another embodiment, a first scan line SL1_*i*−1 and the fourth scan line SL4_*i* may be the same scan line. Both a first scan signal GW_i−1 and the fourth scan signal GB_i are transmitted through the first scan line SL1_*i*−1 and may actually be the same signal.

In an embodiment, the emission control lines EML_1 to EML_m respectively transmit emission control signals EM_1 to EM_m output from the gate driver 120 to the pixels PX in the same row. The data lines DL_1 to DL_n respectively transmit data voltages D1 to Dn output from the data driver 130 to the pixels PX in the same column. The pixel PXij receives the first to fifth scan signals GW_i, GC_i, GI_i, GB_i, and EB_i, respectively, the data voltage Dj, and the emission control signal EM_i.

In an embodiment, each of the power lines PL_1 to PL_n transmits a first driving voltage ELVDD output from the voltage generator 150 to the pixels PX in the same column. Each of the first voltage lines VL1_1 to VL1_*m* transmits a first initialization voltage VINT1 output from the voltage generator 150 to the pixels PX in the same row, each of the second voltage lines VL2_1 to VL2_*m* transmits a second initialization voltage VINT2 output from the voltage generator 150 to the pixels PX in the same row, and each of the third voltage lines VL3_1 to VL3_*m* transmits a bias voltage Vb output from the voltage generator 150 to the pixels PX in the same row.

In an embodiment, the pixel PXij includes a display element and a driving transistor that controls the magnitude of a driving current flowing to the display element based on the data voltage Dj. The data voltage Dj is output from the data driver 130 and received by the pixel PXij through the data line DL_j. The display element may be, for example, an organic light-emitting diode. As the display element emits light with a brightness corresponding to the magnitude of a driving current received from the driving transistor, the pixel PXij may express a gray scale corresponding to the data voltage Dj.

In an embodiment, the pixel PX may correspond to a portion of a unit pixel, for example, a sub-pixel, capable of displaying full color. The pixel PXij may further include at least one switching transistor and at least one capacitor. The pixel PXij is described in more detail below with reference to FIG. 2.

In an embodiment, the voltage generator 150 may generate voltages necessary for driving the pixel PXij. For example, the voltage generator 150 may generate the first driving voltage ELVDD, a second driving voltage ELVSS, the first initialization voltage VINT1, the second initialization voltage VINT2, and the bias voltage Vb. The level of the first driving voltage ELVDD may be greater than the level of the second driving voltage ELVSS. The level of the bias voltage Vb may be greater than the level of the second initialization voltage VINT2. The level of the second initialization voltage VINT2 may be greater than the level of the first initialization voltage VINT1. The level of the second initialization voltage VINT2 may be greater than the level of the second driving voltage ELVSS. A difference between the level of the second initialization voltage VINT2 and the level of the second driving voltage ELVSS may be less than a threshold voltage necessary for the display element of the pixel PX to emit light.

In an embodiment, the voltage generator 150 may provide a first gate voltage VGH and a second gate voltage VGL for controlling a switching transistor of the pixel PXij to the gate driver 120. When the first gate voltage VGH is applied to a gate of the switching transistor, the switching transistor is turned off, and when the second gate voltage VGL is applied to the gate of the switching transistor, the switching transistor may be turned on. The first gate voltage VGH may be referred to as a gate-off voltage, and the second gate voltage VGL may be referred to as a gate-on voltage. Switching transistors of the pixel PXij may be p-type MOSFETs, and the level of the first gate voltage VGH may be greater than the level of the second gate voltage VGL. Although not shown in FIG. 1, the voltage generator 150 may generate gamma reference voltages and/or provide the gamma reference voltages to the data driver 130.

In an embodiment, the timing controller 140 may control the display unit 110 by controlling operation timings of the gate driver 120 and/or the data driver 130. The pixels PX of the display unit 110 may receive new data voltages D1 to Dn for each new frame period, and may display an image corresponding to image source data RGB of one frame by emitting light with a luminance corresponding to the data voltages D1 to Dn.

According to an embodiment, one frame period may include a gate initialization period, a data wiring and anode initialization period, and an emission period. In the gate initialization period, the first initialization voltage VINT1 may be applied to the pixels PX in synchronization with a third scan signal GI. In the data wiring and anode initialization period, the data voltages D1 to Dn may be provided to the pixels PX in synchronization with a first scan signal GW, and the second initialization voltage VINT2 may be applied to the pixels PX in synchronization with a fourth scan signal GB. In the emission period, the pixels PX of the display unit 110 may emit light.

In an embodiment, the timing controller 140 receives the image source data RGB and a control signal CONT from the outside. The timing controller 140 may convert the image source data RGB to image data DATA based on characteristics of the display unit 110 and the pixels PX or the like. The timing controller 140 may provide the image data DATA to the data driver 130.

In an embodiment, the control signal CONT may include at least one of a vertical synchronization signal Vsync, a horizontal synchronization signal Hsync, a data enable signal DE, and a clock signal CLK. The timing controller 140 may control operation timings of the gate driver 120 and the data driver 130 by using the control signal CONT.

In an embodiment, the timing controller 140 may determine a frame period by counting the data enable signal DE of one horizontal scanning period (1H). In this case, the vertical synchronization signal Vsync and the horizontal synchronization signal Hsync, which are supplied from the outside, may be omitted. The image source data RGB includes luminance information of the pixels PX. The luminance may have a predetermined number of gray scales, for example, 1,024(=$2^{10}$) gray scales, 256(=$2^8$) gray scales, or 64(=$2^6$) gray scales.

In an embodiment, the timing controller 140 may generate control signals including a gate timing control signal GDC for controlling an operation timing of the gate driver 120 and a data timing control signal DDC for controlling an operation timing of the data driver 130.

In an embodiment, the gate timing control signal GDC may include a gate start pulse (GSP), a gate shift clock (GSC), and a gate output enable (GOE) signal. The GSP is supplied to the gate driver 120 that generates a first scan signal at a starting time point of a scanning period. The GSC is a clock signal commonly input to the gate driver 120 and is a clock signal for shifting the GSP. The GOE signal controls the output of the gate driver 120.

In an embodiment, the data timing control signal DDC may include a source start pulse (SSP), a source sampling clock (SSC), and a source output enable (SOE) signal. The SSP controls a data sampling starting time point of the data driver 130 and is provided to the data driver 130 at the starting time point of the scanning period. The SSC is a clock signal that controls a data sampling operation within the data driver 130 based on a rising or falling edge. The SOE signal controls the output of the data driver 130. Meanwhile, the SSP supplied to the data driver 130 may be omitted according to a data transmission method.

In an embodiment, the gate driver 120 sequentially generates the first scan signals GW_1 to GW_m, the second scan signals GC_1 to GC_m, the third scan signals GI_1 to GI_m, the fourth scan signals GB_1 to GB_m, and the fifth scan signals EB_1 to EB_m, in response to the gate timing control signal GDC supplied from the timing controller 140 by using the first and second gate voltages VGH and VGL provided from the voltage generator 150.

In an embodiment, the data driver 130 samples and latches the image data DATA supplied from the timing controller 140 and converts the image data DATA into data of a parallel data system, in response to the data timing control signal DDC supplied from the timing controller 140. When converting the image data DATA into the data of the parallel data system, the data driver 130 converts the image data DATA into an analog data voltage using gamma reference voltages. The data driver 130 provides the data voltages D1 to Dn to the pixels PX through the data lines DL_1 to DL_n. The pixels PX receive the data voltages D1 to Dn in response to the first scan signals GW_1 to GW_m.

FIG. 2 illustrates a pixel circuit of a pixel according to an embodiment.

In an embodiment and referring to FIG. 2, the pixel PXij is connected to the first to fifth scan lines SL1_*i*, SL2_*i*, SL3_*i*, SL4_*i*, and SL5_*i*, respectively, that transmit the first to fifth scan signals GW_i, GC_i, GI_i, GB_i, and EB_i, respectively, the data line DL_j that transmits the data voltage Dj, and the emission control line EML_i that transmits the emission control signal EM_i. The pixel PXij is connected to the power line PL_j that transmits the first driving voltage ELVDD, the first voltage line VL1_*i* that transmits the first initialization voltage VINT1, the second voltage line VL2_*i* that transmits the second initialization voltage VINT2, and the third voltage line VL3_*i* that transmits the bias voltage Vb. The pixel PXij is connected to a common electrode to which the second driving voltage ELVSS is applied. The pixel PXij may correspond to the pixel PXij of FIG. 1.

In an embodiment, the pixel PXij includes a display element OLED, first to eighth transistors T1 to T8, respectively, a first capacitor (or storage capacitor) C1, and a second capacitor C2. The display element OLED may be an organic light-emitting diode having an anode and a cathode.

The cathode may be a common electrode to which the second driving voltage ELVSS is applied. The first capacitor C1 may have a first electrode and a second electrode. The second capacitor C2 may have a third electrode and a fourth electrode.

In an embodiment, the first transistor T1 may be a driving transistor in which the magnitude of a source-drain current is determined according to a gate-source voltage, and the second to eighth transistors T2 to T8, respectively, may each be a switching transistor that is turned on/turned off according to a gate-source voltage, substantially a gate voltage. Each of the second to eighth transistors T2 to T8, respectively, may include one switching transistor or may include a plurality of switching transistors that are controlled simultaneously by the same gate signal and connected with each other in series. The first to eighth transistors T1 to T8, respectively, may each be formed as a thin-film transistor.

In an embodiment, the first transistor T1 may control the magnitude of a driving current Id flowing from the power line PL_j to the display element OLED according to a gate-source voltage. The first transistor T1 may have a gate connected to the second electrode of the first capacitor C1, a source connected to the power line PL_j through the fifth transistor T5, and a drain connected to the display element OLED through the sixth transistor T6.

In an embodiment, the first transistor T1 may output the driving current Id to the display element OLED. The magnitude of the driving current Id may be determined based on a gate-source voltage of the first transistor T1. The gate-source voltage of the first transistor T1 corresponds to a difference between a gate voltage and a source voltage. For example, the magnitude of the driving current Id may be determined based on a difference between the gate-source voltage of the first transistor T1 and a threshold voltage of the first transistor T1. The display element OLED may receive the driving current Id from the first transistor T1 and may emit light with a brightness according to the magnitude of the driving current Id.

In an embodiment, the second transistor T2 receives the data voltage Dj in response to the first scan signal GW_i. The second transistor T2 transmits the data voltage Dj to the source of the first transistor T1 in response to the first scan signal GW_i. The second transistor T2 may have a gate connected to the first scan line SL1_*i*, a source connected to the data line DL_j, and a drain connected to the source of the first transistor T1.

In an embodiment, the first capacitor C1 is connected to the gate of the first transistor T1. The first capacitor C1 may be connected between the power line PL_j and the gate of the first transistor T1. The first capacitor C1 may have the first electrode connected to the power line PL_j and the second electrode connected to the gate of the first transistor T1. The first capacitor C1 may store a difference between the first driving voltage ELVDD applied to the power line PL_j and the gate voltage of the first transistor T1, and may maintain the gate voltage of the first transistor T1.

In an embodiment, the second capacitor C2 is connected to the source of the first transistor T1. The second capacitor C2 may be connected between the power line PL_j and the source of the first transistor T1. The second capacitor C2 may have the third electrode connected to the power line PL_j and the fourth electrode connected to the source of the first transistor T1.

In an embodiment, the third transistor T3 may be connected between the gate and the drain of the first transistor T1, and may connect the gate and the drain of the first transistor T1 with each other in response to the second scan signal GC_i. The third transistor T3 may have a gate connected to the second scan line SL2_*i*, a source connected to the drain of the first transistor T1, and a drain connected to the gate of the first transistor T1.

In an embodiment, when the third transistor T3 is turned on in response to the second scan signal GC_i, the drain and the gate of the first transistor T1 are connected with each other such that the first transistor T1 may be diode-connected. The source of the first transistor T1 receives the data voltage Dj in response to the first scan signal GW_i, and the data voltage Dj is transmitted to the gate of the first transistor T1 through the first transistor T1 that is diode-connected. When the gate voltage of the first transistor T1 becomes equal to a voltage obtained by subtracting the threshold voltage of the first transistor T1 from the data voltage Dj, the first transistor T1 is turned off, and the voltage obtained by subtracting the threshold voltage of the first transistor T1 from the data voltage Dj is stored in the first capacitor C1.

In an embodiment, as shown in FIG. 2, the third transistor T3 may include a pair of third transistors T3*a* and T3*b*, which are controlled simultaneously by the second scan signal GC_i and are connected with each other in series between the gate and the drain of the first transistor T1.

In an embodiment, the fourth transistor T4 applies the first initialization voltage VINT1 to the gate of the first transistor T1 in response to the third scan signal GI_i. The fourth transistor T4 may have a gate connected to the third scan line SL3_*i*, a source connected to the gate of the first transistor T1, and a drain connected to the first voltage line VL1_*i*.

In an embodiment, as shown in FIG. 2, the fourth transistor T4 may include a pair of fourth transistors T4*a* and T4*b*, which are controlled simultaneously by the third scan signal GI_i and are connected with each other in series between the gate of the first transistor T1 and the first voltage line VL1_*i*.

In an embodiment, the fifth and sixth transistors T5 and T6 may generate a path of the driving current Id between the power line PL_j and the display element OLED in response to the emission control signal EM_i.

In an embodiment, the fifth transistor T5 may connect the power line PL_j and the source of the first transistor T1 with each other in response to the emission control signal EM_i. The fifth transistor T5 may have a gate connected to the emission control line EML_i, a source connected to the power line PL_j, and a drain connected to the source of the first transistor T1.

In an embodiment, the sixth transistor T6 may connect the drain of the first transistor T1 and the anode of the display element OLED with each other in response to the emission control signal EM_i. The sixth transistor T6 may have a gate connected to the emission control line EML_i, a source connected to the drain of the first transistor T1, and a drain connected to the anode of the display element OLED.

In an embodiment, the seventh transistor T7 applies the second initialization voltage VINT2 to the anode of the display element OLED in response to the fourth scan signal GB_i. The seventh transistor T7 may have a gate connected to the fourth scan line SL4_*i*, a source connected to the anode of the display element OLED, and a drain connected to the second voltage line VL2_*i*.

In an embodiment, the eighth transistor T8 applies the bias voltage Vb to the source of the first transistor T1 in response to the fifth scan signal EB_i. The eighth transistor T8 may have a gate connected to the fifth scan line SL5_*i*, a source connected to the third voltage line VL3_*i*, and a drain connected to the source of the first transistor T1.

In an embodiment, the pixel PXij may operate at a first scanning rate in a first mode and operate at a second scanning rate in a second mode. The first scanning rate and the second scanning rate may be different from each other. For example, the second scanning rate may be smaller than the first scanning rate.

In an embodiment, the eighth transistor T8 is in an off state in the first mode and may transmit the bias voltage Vb to the first transistor T1 in response to the fifth scan signal EB_i in the second mode. The fifth scan signal EB_i may have a voltage at a turn-off level in the first mode. This is described in more detail with reference to FIGS. 3 and 4 described below.

Figure 3:
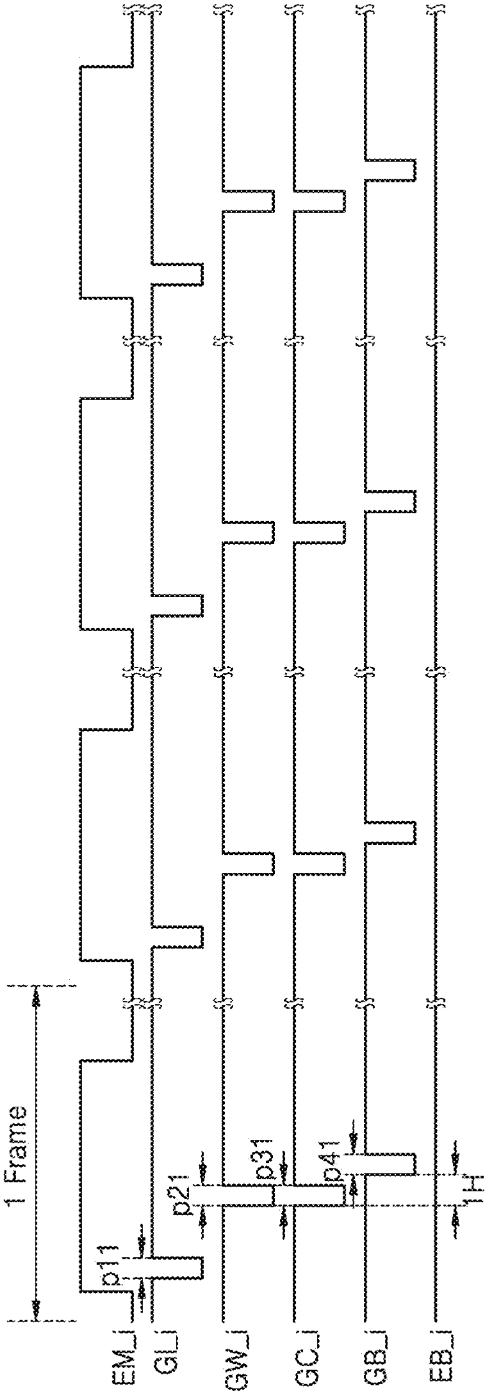
FIG. 3 is a timing diagram of control signals for operating the pixel circuit shown in FIG. 2 in a first mode according to an embodiment.

In an embodiment and referring to FIG. 3 illustrates a timing diagram of control signals for operating the pixel circuit shown in FIG. 2 in the first mode. In particular, FIG. 3 illustrates a timing diagram of control signals applied to a pixel circuit that operates at the first scanning rate in the first mode. For example, the first scanning rate may be 120 Hz.

In an embodiment and referring to FIG. 3 together with FIG. 2, the fifth and sixth transistors T5 and T6 are turned off in a period in which the emission control signal EM_i has a pulse at a turn-off level (for example, high level). The period in which the emission control signal EM_i has the pulse at the turn-off level may be referred to as a non-emission period.

In an embodiment, in the non-emission period, the first transistor T1 stops outputting the driving current Id, and the display element OLED stops emitting light.

In an embodiment, the third scan signal GI_i initially has a first pulse p11 at a turn-on level (for example, low level). A period in which the third scan signal GI_i has the first pulse p11 may be referred to as a gate initialization period.

In an embodiment, during the gate initialization period, the fourth transistor T4 is turned on, and the first initialization voltage VINT1 is applied to the gate of the first transistor T1, that is, the second electrode of the first capacitor C1. A difference (ELVDD−VINT1) between the first driving voltage ELVDD and the first initialization voltage VINT1 is stored in the first capacitor C1.

In an embodiment, after the third scan signal GI_i transitions to the turn-off level again, the first scan signal GW_i has a second pulse P21 at the turn-on level, and the second scan signal GC_i has a third pulse p31 at the turn-on level. A period in which the first scan signal GW_i has the second pulse P21 and the second scan signal GC_i has the third pulse p31 may be referred to as a data writing period.

In an embodiment, during the data writing period, the second transistor T2 and the third transistor T3 are turned on, and the data voltage Dj is received by the source of the first transistor T1. The first transistor T1 is diode-connected by the third transistor T3 and biased in a forward direction. A voltage of the second electrode of the first capacitor C1 increases from the first initialization voltage VINT1. When the gate voltage of the first transistor T1 becomes equal to a voltage (Dj−|Vth|) reduced by the threshold voltage (Vth) of the first transistor T1 from the data voltage Dj, the first transistor T1 is turned off and simultaneously the gate voltage of the first transistor T1 stops increasing. Accordingly, the gate voltage of the first transistor T1 becomes Dj−|Vth|, and a difference (ELVDD−Dj+|Vth|) between the first driving voltage ELVDD and the gate voltage (Dj−|Vth|) is stored in the first capacitor C1.

In addition, in an embodiment, after the third scan signal GI_i transitions to the turn-off level, the fourth scan signal GB_i has a fourth pulse p41 of the turn-on level. A period in which the fourth scan signal GB_i has the fourth pulse p41 may be referred to as an anode initialization period.

In an embodiment, during the anode initialization period, the seventh transistor T7 is turned on, and the second initialization voltage VINT2 is applied to the anode of the display element OLED. By applying the second initialization voltage VINT2 to the anode of the display element OLED to completely prevent the display element OLED from emitting light, a phenomenon in which the display element OLED slightly emits light to correspond to a black gray scale in the next frame may be removed.

In an embodiment, afterwards, the first scan signal GW_i, the second scan signal GC_i, and the fourth scan signal GB_i transition to the turn-off level, and the emission control signal EM_i has the turn-on level. A period in which the emission control signal EM_i has the turn-on level may be referred to as an emission period.

In an embodiment, during the emission period, the fifth and sixth transistors T5 and T6 are turned on. The first transistor T1 may output the voltage stored in the first capacitor C1, that is, the driving current Id having a magnitude corresponding to a voltage (ELVDD−Dj) obtained by subtracting the threshold voltage (|Vth|) of the first transistor T1 from the source-gate voltage (ELVDD−Dj+|Vth|) of the first transistor T1, and may emit light with a luminance corresponding to the magnitude of the driving current Id.

In an embodiment, while the pixel circuit operates at the first scanning rate in the first mode, the fifth scan signal EB_i may have a voltage at the turn-off level. While the pixel circuit operates at the first scanning rate in the first mode, the eighth transistor T8 may be in an off state.

In an embodiment, the fourth scan signal GB_i may be substantially synchronized with the first scan signal GW_i−1 of the previous row. For example, as shown in FIG. 3, an interval between a falling edge of the second pulse P21 and a falling edge of the fourth pulse p41 may be one horizontal scanning period (1H).

In another embodiment, the fourth scan signal GB_i may be substantially synchronized with the first scan signal GW_i+1 of the next row.

Figure 4:
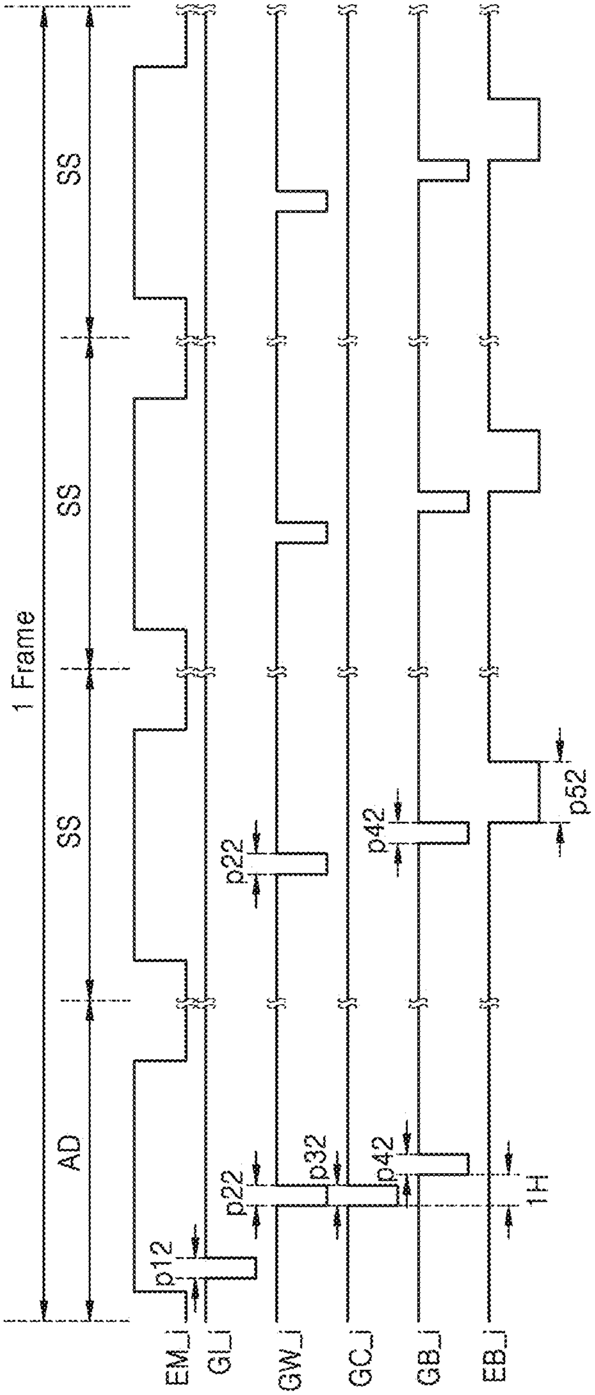
FIG. 4 is a timing diagram of control signals for operating the pixel circuit shown in FIG. 2 in a second mode according to an embodiment.

In an embodiment, FIG. 4 illustrates a timing diagram of control signals for operating the pixel circuit shown in FIG. 2 in the second mode. In particular, FIG. 4 illustrates a timing diagram of control signals applied to a pixel circuit that operates at the second scanning rate in the second mode. For example, the second scanning rate may be 30 Hz.

In an embodiment and referring to FIG. 4, one frame period 1 Frame in the second mode may include a display scanning period AD and a self-scanning period SS. For example, as shown in FIG. 4, the one frame period 1 Frame may include one display scanning period AD and three self-scanning period SS.

In an embodiment, the length of the display scanning period AD and the length of the self-scanning period SS may be substantially the same.

In an embodiment, the third scan signal GI_i may have a first pulse p12 at the turn-on level in the display scanning period AD and may have a voltage at the turn-off level during the self-scanning period SS. A period in which the third scan signal GI_i has the first pulse p12 may be referred to as a gate initialization period. The display scanning period AD may include the gate initialization period.

In an embodiment, during the gate initialization period of the display scanning period AD, the fourth transistor T4 is turned on, and the first initialization voltage VINT1 is applied to the gate of the first transistor T1, that is, the second electrode of the first capacitor C1. A difference (ELVDD−VINT1) between the first driving voltage ELVDD and the first initialization voltage VINT1 is stored in the first capacitor C1.

In an embodiment, the first scan signal GW_i may have second pulses p22 at the turn-on level respectively in the display scanning period AD and the self-scanning period SS. The second scan signal GC_i may have a third pulse p32 at the turn-on level in the display scanning period AD and may have a voltage at the turn-off level during the self-scanning period SS. A period in which the first scan signal GW_i has the second pulse p22 and the second scan signal GC_i has the third pulse p32 may be referred to as a data writing period. The display scanning period AD may include the data writing period.

In an embodiment, during the data writing period of the display scanning period AD, the second transistor T2 and the third transistor T3 are turned on, and the data voltage Dj is received by the source of the first transistor T1. The first transistor T1 is diode-connected by the third transistor T3 and biased in a forward direction. A voltage of the second electrode of the first capacitor C1 increases from the first initialization voltage VINT1. When the gate voltage of the first transistor T1 becomes equal to a voltage (Dj−|Vth|) reduced by the threshold voltage (Vth) of the first transistor T1 from the data voltage Dj, the first transistor T1 is turned off and simultaneously the gate voltage of the first transistor T1 stops increasing. Accordingly, the gate voltage of the first transistor T1 becomes Dj−|Vth|, and a difference (ELVDD−Dj+|Vth|) between the first driving voltage ELVDD and the gate voltage (Dj−|Vth|) is stored in the first capacitor C1.

In an embodiment, while the first scan signal GW_i has the second pulse p22 in the self-scanning period SS, the second transistor T2 is turned on, and the data voltage Dj is received by the source of the first transistor T1. In this case, the data voltage Dj received by the source of the first transistor T1 in the self-scanning period SS may be substantially the same as the bias voltage Vb.

In an embodiment, the fourth scan signal GB_i may have fourth pulses p42 at the turn-on level respectively in the display scanning period AD and the self-scanning period SS. A period in which the fourth scan signal GB_i has the fourth pulse p42 in the display scanning period AD may be referred to as an anode initialization period. The display scanning period AD may include the anode initialization period.

In an embodiment, during the anode initialization period of the display scanning period AD, the seventh transistor T7 is turned on, and the second initialization voltage VINT2 is applied to the anode of the display element OLED. By applying the second initialization voltage VINT2 to the anode of the display element OLED to completely prevent the display element OLED from emitting light, a phenomenon in which the display element OLED slightly emits light to correspond to a black gray scale in the next frame may be removed.

In an embodiment, while the fourth scan signal GB_i has the fourth pulse p42 in the self-scanning period SS, the seventh transistor T7 is turned on, and the second initialization voltage VINT2 is applied to the anode of the display element OLED.

In an embodiment, the fifth scan signal EB_i may have a voltage at the turn-off level during the display scanning period AD and may have a fifth pulse p52 at the turn-on level in the self-scanning period SS. The eighth transistor T8 may be in an off state during the display scanning period AD.

In an embodiment, while the fifth scan signal EB_i has the fifth pulse p52 in the self-scanning period SS, the eighth transistor T8 is turned on, and the bias voltage Vb is applied to the source of the first transistor T1.

In an embodiment, the width of the fifth pulse p52 may be greater than the width of the second pulse p22 and the width of the fourth pulse p42.

In an embodiment, the width of the fifth pulse p52 may be greater than one horizontal scanning period (1H). For example, the width of the fifth pulse p52 may be four horizontal scanning periods (4H), eight horizontal scanning periods (8H), or 16 horizontal scanning periods (16H).

In an embodiment, the widths of the first to fourth pulses p12, p22, p32, and p42, respectively, may be substantially the same. For example, the widths of the first to fourth pulses p12, p22, p32, and p42, respectively, may be one horizontal scanning period (1H).

In an embodiment, the fourth scan signal GB_i may be substantially synchronized with the first scan signal GW_i−1 of the previous row. For example, as shown in FIG. 4, an interval between a falling edge of the second pulse p22 and a falling edge of the fourth pulse p42 may be one horizontal scanning period (1H).

In another embodiment, the fourth scan signal GB_i may be substantially synchronized with the first scan signal GW_i+1 of the next row.

Figure 5:
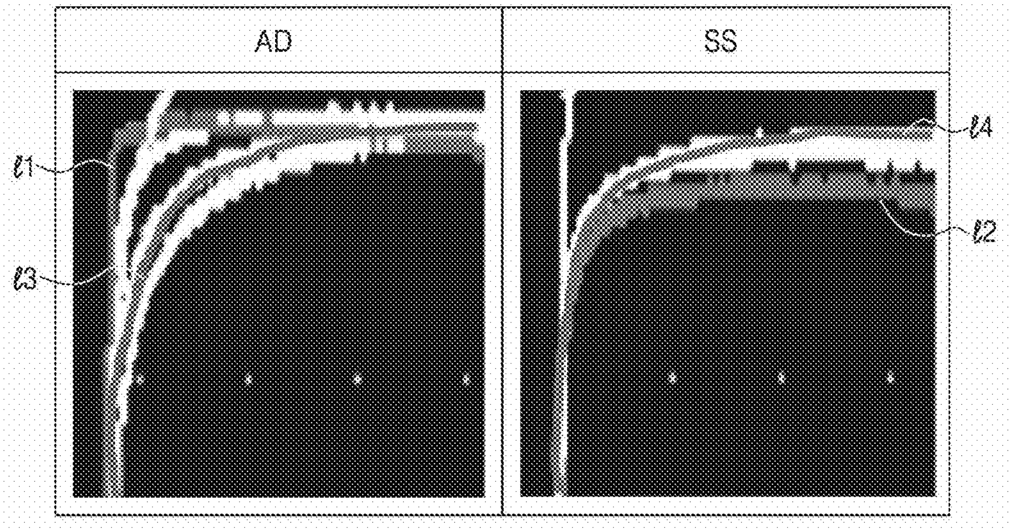
FIG. 5 is a comparison table of light waveforms in the second mode according to an embodiment.
Figure 6:
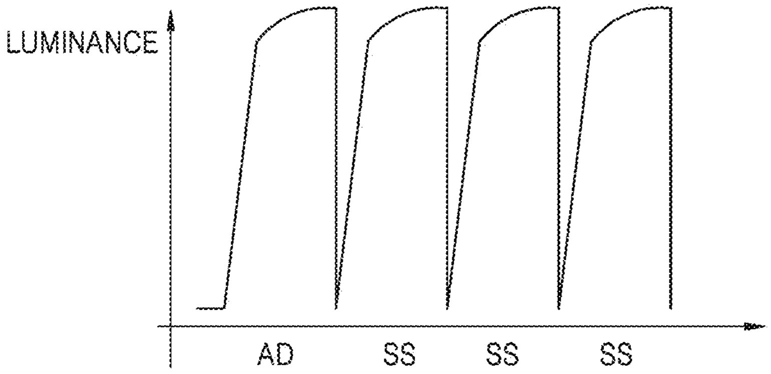
FIG. 6 is a luminance graph in the second mode according to an embodiment.

In an embodiment, FIG. 5 illustrates a comparison table of light waveforms in the second mode, and FIG. 6 illustrates a luminance graph in the second mode.

First, referring to FIG. 5, in an embodiment, a first waveform ℓ1 represents a luminance in the display scanning period AD when the seventh transistor T7 and the eighth transistor T8 are controlled by the same scan signal, and a second waveform ℓ2 represents a luminance in the self-scanning period SS when the seventh transistor T7 and the eighth transistor T8 are controlled by the same scan signal. A third waveform 83 represents a luminance in the display scanning period AD when the seventh transistor T7 and the eighth transistor T8 are respectively controlled by different scan signals, and a fourth waveform ℓ4 represents a luminance in the self-scanning period SS when the seventh transistor T7 and the eighth transistor T8 are respectively controlled by different scan signals.

In an embodiment, the first waveform ℓ1 and the second waveform ℓ2 are different from each other, whereas the third waveform ℓ3 and the fourth waveform ℓ4 are substantially the same. In other words, when the seventh transistor T7 and the eighth transistor T8 are controlled by the same scan signal, a luminance difference between the display scanning period AD and the self-scanning period SS occurs, and when the seventh transistor T7 and the eighth transistor T8 are respectively controlled by different scan signals, a luminance difference between the display scanning period AD and the self-scanning period SS decreases.

As described above with reference to FIGS. 3 and 4, according to an embodiment, the seventh transistor T7 may be controlled by the fourth scan signal GB_i, and the eighth transistor T8 may be controlled by the fifth scan signal EB_i. In this case, the fourth scan signal GB_i may have the fourth pulse p41 at the turn-on level during the one frame period 1 Frame in the first mode, and may have the fourth pulses p42 at the turn-on level respectively in the display scanning period AD and the self-scanning period SS in the second mode. The fifth scan signal EB_i may have a voltage at the turn-off level in the first mode, and may have a voltage at the turn-off level during the display scanning period AD and may have the fifth pulse p52 at the turn-on level in the self-scanning period SS in the second mode. The width of the fifth pulse p52 may be greater than the width of the fourth pulse p42.

Likewise, in an embodiment, when the seventh transistor T7 and the eighth transistor T8 are respectively controlled by different scan signals, the eighth transistor T8 may be maintained in an off state during the display scanning period AD, and the length of a period in which the eighth transistor T8 is turned on may be separately adjusted during the self-scanning period SS. In this case, as shown in FIG. 6, since the luminance of the display scanning period AD and the self-scanning period SS becomes substantially the same, a luminance difference between the display scanning period AD and the self-scanning period SS decreases.

Figure 7:
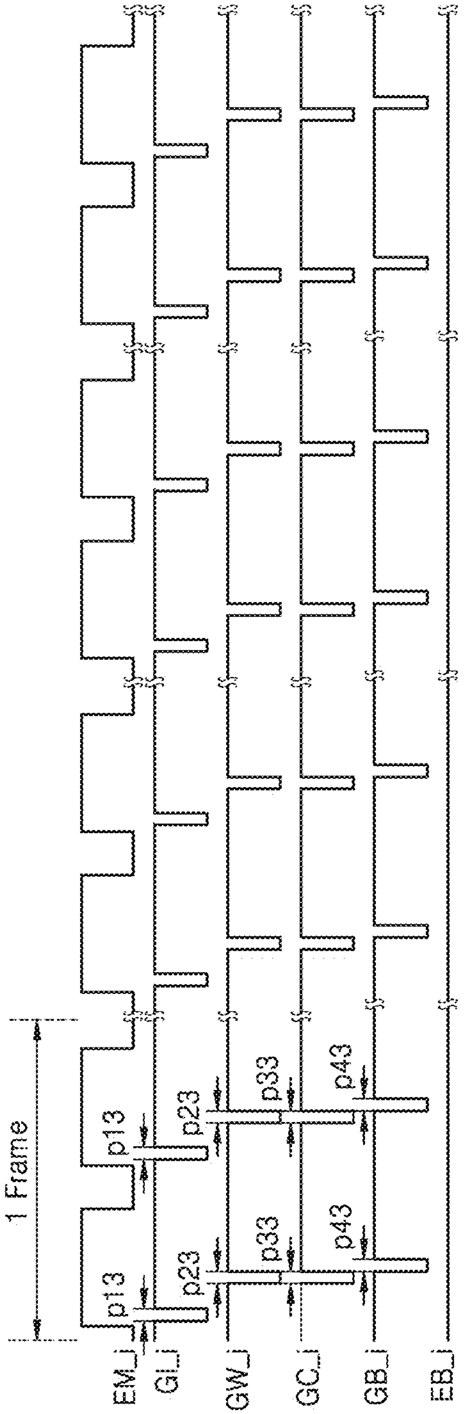
FIG. 7 is a timing diagram of control signals for operating the pixel circuit shown in FIG. 2 in the first mode according to an embodiment.

FIG. 7 illustrates a timing diagram of control signals for operating the pixel circuit shown in FIG. 2 in the first mode according to an embodiment.

Referring to FIG. 7, in an embodiment, unlike the timing diagram shown in FIG. 3, the one frame period 1 Frame may include a plurality of non-emission periods. For example, as shown in FIG. 7, the one frame period 1 Frame may include two non-emission periods.

In an embodiment, a scan signal may have a pulse at the turn-on level during each non-emission period. For example, the third scan signal GI_i may have a first pulse p13 at the turn-on level during each non-emission period, the first scan signal GW_i may have a second pulse p23 at the turn-on level during each non-emission period, the second scan signal GC_i may have a third pulse p33 at the turn-on level during each non-emission period, and the fourth scan signal GB_i may have a fourth pulse p43 at the turn-on level during each non-emission period.

In other words, in an embodiment, the third scan signal GI_i may have two first pulses p13 during the one frame period 1 Frame, the first scan signal GW_i may have two second pulses p23 during the one frame period 1 Frame, the second scan signal GC_i may have two third pulses p33 during the one frame period 1 Frame, and the fourth scan signal GB_i may have two fourth pulses p43 during the one frame period 1 Frame.

Hereinbefore, the pixel and the display apparatus have been mainly described, but the disclosure is not limited thereto. For example, a method of manufacturing such a pixel and a method of manufacturing such a display apparatus also belong to the scope of the disclosure.

While the invention has been particularly shown and described with reference to embodiments thereof, it will be understood that various changes in form and details may be made therein without departing from the spirit and scope of the following claims. It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims. The embodiments of the present disclosure disclosed in the present disclosure and illustrated in the drawings are provided as particular examples for more easily explaining the technical contents according to the present disclosure and helping understand the embodiments of the present disclosure, but not intended to limit the scope of the embodiments of the present disclosure. Accordingly, the scope of the various embodiments of the present disclosure should be interpreted to include, in addition to the embodiments disclosed herein, all alterations or modifications derived from the technical ideas of the various embodiments of the present disclosure. Moreover, the embodiments or parts of the embodiments may be combined in whole or in part without departing from the scope of the invention.

What is claimed is:

1. A pixel that operates at a first scanning rate in a first mode and operates at a second scanning rate in a second mode, the pixel comprising:

a display element having an anode and a cathode;

a first transistor that controls a magnitude of a driving current flowing to the display element according to a gate-source voltage; and a second transistor that is in an off state during all frame periods in the first mode and transmits a bias voltage to the first transistor in response to a first scan signal in the second mode.

2. The pixel of claim 1, wherein the second scanning rate is smaller than the first scanning rate.

3. The pixel of claim 1, wherein one frame period in the second mode comprises a display scanning period and a self-scanning period, and the first scan signal has a voltage at a turn-off level throughout the display scanning period and has a pulse at a turn-on level throughout the self-scanning period.

4. The pixel of claim 3, wherein a width of a pulse voltage at the turn-on level is greater than one horizontal scanning period (1H).

5. The pixel of claim 1, further comprising:

a first capacitor connected to a gate of the first transistor;

a third transistor that transmits a data voltage to a source of the first transistor in response to a second scan signal; and a fourth transistor that transmits a first initialization voltage to the anode of the display element in response to a third scan signal, wherein the second transistor transmits the bias voltage to the source of the first transistor in response to the first scan signal in the second mode.

6. The pixel of claim 5, wherein one frame period in the second mode comprises a display scanning period and a self-scanning period, the first scan signal has a voltage at a turn-off level throughout the display scanning period and has a first pulse at a turn-on level throughout the self-scanning period, the second scan signal has second pulses at the turn-on level within the display scanning period and within the self-scanning period, and the third scan signal has third pulses at the turn-on level within the display scanning period and within the self-scanning period.

7. The pixel of claim 6, wherein a width of the first pulse is greater than a width of each of the second pulses and a width of each of the third pulses.

8. The pixel of claim 6, wherein an interval between a falling edge of one of the second pulses and a falling edge of a corresponding one of the third pulses is one horizontal scanning period (1H).

9. The pixel of claim 6, wherein the data voltage transmitted to the source of the first transistor within the self-scanning period is substantially the same as the bias voltage.

10. The pixel of claim 5, wherein a level of the bias voltage is greater than a level of the first initialization voltage.

11. The pixel of claim 5, further comprising a fifth transistor that connects the gate of the first transistor and a drain of the first transistor with each other in response to a fourth scan signal, wherein one frame period in the second mode comprises a display scanning period and a self-scanning period, and the fourth scan signal has a fourth pulse at a turn-on level within the display scanning period and has a voltage at a turn-off level throughout the self-scanning period.

12. The pixel of claim 11, further comprising a sixth transistor that transmits a second initialization voltage to the gate of the first transistor in response to a fifth scan signal, wherein the fifth scan signal has a fifth pulse at the turn-on level in the display scanning period and has a voltage at the turn-off level during the self-scanning period.

13. The pixel of claim 12, wherein the second scan signal has multiple second pulses at the turn-on level within the display scanning period and within the self-scanning period, and a width of the fourth pulse is substantially equal to a width of each of the second pulses and a width of the fifth pulse.

14. The pixel of claim 5, further comprising a second capacitor connected to the source of the first transistor.

15. A pixel that operates at a first scanning rate in a first mode, operates at a second scanning rate in a second mode, and is connected to a first scan line, a second scan line, a third scan line, a fourth scan line and a fifth scan line that transmit a first scan signal, a second scan signal, a third scan signal, a fourth scan signal and a fifth scan signal, respectively, an emission control line that transmits an emission control signal, a data line that transmits a data voltage, a power line that transmits a driving voltage, and a first voltage line, a second voltage line and a third voltage line that transmits a first initialization voltage, a second initialization voltage, and a bias voltage, respectively, the pixel comprising:

a display element having an anode and a cathode;

a first capacitor having a first electrode connected to the power line, and a second electrode;

a first transistor having a gate connected to the second electrode of the first capacitor, a source connected to the power line, and a drain connected to the anode of the display element;

a second transistor having a gate connected to the first scan line, a source connected to the data line, and a drain connected to the source of the first transistor;

a third transistor having a gate connected to the second scan line, a source connected to the drain of the first transistor, and a drain connected to the gate of the first transistor;

a fourth transistor having a gate connected to the third scan line, a source connected to the gate of the first transistor, and a drain connected to the first voltage line;

a fifth transistor having a gate connected to the emission control line, a source connected to the power line, and a drain connected to the source of the first transistor;

a sixth transistor having a gate connected to the emission control line, a source connected to the drain of the first transistor, and a drain connected to the anode of the display element;

a seventh transistor having a gate connected to the fourth scan line, a source connected to the anode of the display element, and a drain connected to the second voltage line; and an eighth transistor having a gate connected to the fifth scan line, a source connected to the third voltage line, and a drain connected to the source of the first transistor, and being in an off state during all frame periods in the first mode.

16. The pixel of claim 15, wherein the second scanning rate is smaller than the first scanning rate.

17. The pixel of claim 15, further comprising a second capacitor having a third electrode connected to the power line, and a fourth electrode connected to the source of the first transistor.

18. The pixel of claim 15, wherein the one frame period in the second mode comprises a display scanning period and a self-scanning period, first pulses at a turn-on level are applied to the first scan line within the display scanning period and within the self-scanning period, a second pulse at the turn-on level is applied to the second scan line within the display scanning period, and a voltage at a turn-off level is applied to the second scan line throughout the self-scanning period, a third pulse at the turn-on level is applied to the third scan line within the display scanning period, and a voltage at the turn-off level is applied to the third scan line throughout the self-scanning period, fourth pulses at the turn-on level are applied to the fourth scan line within the display scanning period and within the self-scanning period, and a voltage at the turn-off level is applied to the fifth scan line throughout the display scanning period, and a fifth pulse at the turn-on level is applied to the fifth scan line within the self-scanning period.

19. The pixel of claim 18, wherein a width of the fifth pulse is greater than a width of each of the first pulses and a width of each of the fourth pulses.

20. A display apparatus comprising:

a substrate extending in a first direction and a second direction; and a plurality of pixels disposed on the substrate in the first direction and the second direction to operate at a first scanning rate in a first mode and operate at a second scanning rate in a second mode, wherein at least one of the plurality of pixels comprises:

a display element having an anode and a cathode;

a first transistor that controls a magnitude of a driving current flowing to the display element according to a gate-source voltage; and a second transistor that is in an off state during all frame periods in the first mode and transmits a bias voltage to the first transistor in response to a first scan signal in the second mode.

* * * * *